US005848202A

United States Patent [19]

D'Eri et al.

[11] Patent Number: 5,848,202

[45] Date of Patent: Dec. 8, 1998

[54] SYSTEM AND METHOD FOR IMAGING AND CODING DOCUMENTS

[75] Inventors: John R. D'Eri, Muttontown; Ronald J. Weiss, Wantagh; Jennifer L. Spry, New York, all of N.Y.

[73] Assignee: Document Handling Technologies, Inc., New York, N.Y.

[21] Appl. No.: 624,299

[22] Filed: Mar. 29, 1996

Related U.S. Application Data

[60] Provisional application No. 60/012,291 Feb. 26, 1996.

[51] Int. Cl.[6] .......... G06K 9/03; G06K 19/00; G06F 17/00

[52] U.S. Cl. .......... 382/306; 235/375; 235/462; 235/487

[58] Field of Search .......... 382/305, 306; 235/375, 462, 470, 487, 494; 395/115, 117

[56] References Cited

U.S. PATENT DOCUMENTS

| | | | |
|---|---|---|---|
| 5,467,933 | 11/1995 | Lamprecht, Jr. et al. | 395/117 |
| 5,504,322 | 4/1996 | Pavlidis et al. | 235/494 |
| 5,519,200 | 5/1996 | Williams | 235/487 |
| 5,596,652 | 1/1997 | Piatek et al. | 392/115 |
| 5,696,365 | 12/1997 | Ukai et al. | 235/375 |

*Primary Examiner*—Jose L. Couso
*Assistant Examiner*—Matthew C. Bella
*Attorney, Agent, or Firm*—Fish & Neave; Jeffrey H. Ingerman

[57] ABSTRACT

A system and method for coding of documents, such as in a litigation support setting, uses machine readable indicia to increase the speed and accuracy of coding operations. For example, bar codes can be used on the documents to represent document numbers or other unique identifier, and can also be provided on "blotters" or menus and used to represent keyword data to be coded. Thus, a coding operator can scan a bar code or other indicium on the document and then scan the bar codes for all appropriate keywords. The system would then associate that document with those keywords. Once the bar codes or other indicia have been affixed to the documents, they can be used during further copying or imaging operations to make sure that the document feeders for those operations do not misfeed any documents, by automatically scanning the indicia and checking that they appear in the expected order. If they do not, the process can be stopped and the operator notified.

24 Claims, 5 Drawing Sheets

FIG. 5
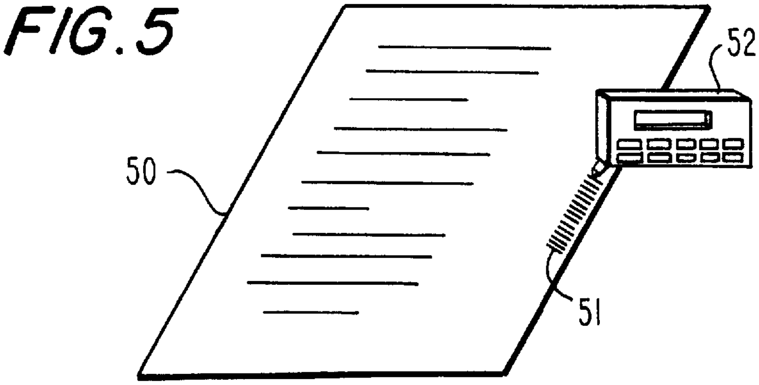
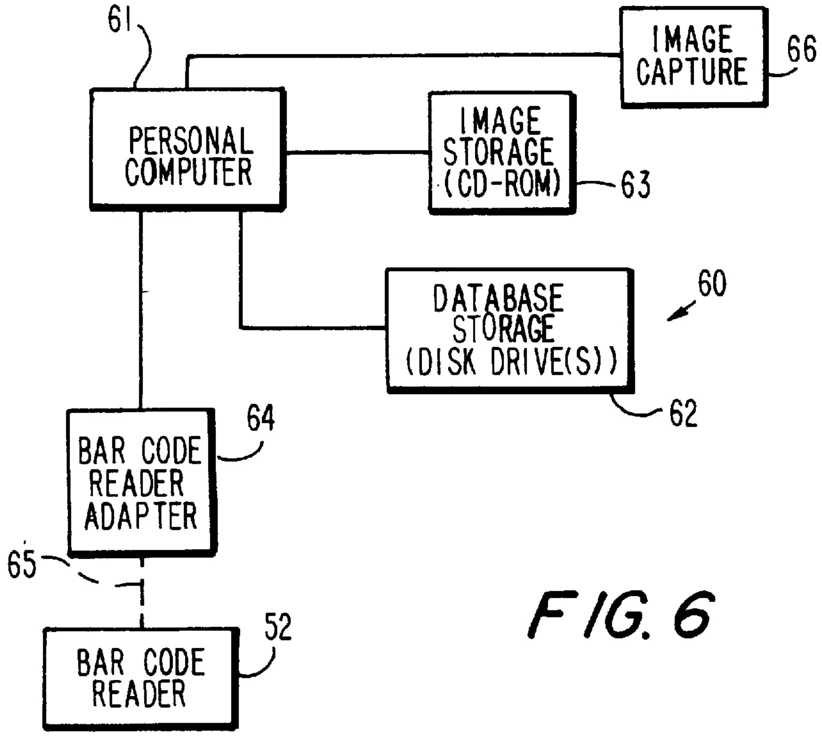
FIG. 6

SYSTEM AND METHOD FOR IMAGING AND CODING DOCUMENTS

CROSS REFERENCE TO RELATED APPLICATION

This claims the benefit of United States Provisional application No. 60/012,291, filed Feb. 26, 1996.

BACKGROUND OF THE INVENTION

This invention relates to systems and methods for imaging and coding documents. More particularly, this invention relates to the use of machine readable indicia on and off a document to enter, into a database, information regarding the content of the document.

It is known, particularly in the field of litigation support, to catalog documents according to information contained in the documents. For example, where a set of documents represents evidence in a lawsuit, the documents may be catalogued according to date, author, recipient, and individuals and subjects referred to. This information, along with numbers assigned, substantially sequentially, to the documents themselves, allows subsets of the documents to be generated in useful ways. For example, in a litigation support context, it may be important to be able to produce a subset of documents representing, in chronological order, all documents in which a particular individual is mentioned, whether as author, recipient or subject.

Known databases for such litigation support purposes have heretofore been compiled essentially manually. In a process known as document coding, individuals are given a list of names and subject matter items that should be entered into the database. Those individuals review documents and, by typing at a keyboard, enter into the database those names and subject items that they find in each document, which are identified by the previously assigned document number described above. The use of manual typing to enter these data slows the data entry process, putting a limit on the number of documents per unit time that can be processed by even the best operator. In addition, the possibility exists for spelling errors and data entry differences among operators that may affect the retrieval of the data later.

Typically, document sets prepared for litigation support purposes are copied many times. While a master set may have been checked manually to see that all of the documents are present, copying frequently takes place en masse, and automatic document feeders may miss documents—e.g., by feeding two or more sheets at once. Without manually checking each set of output copies, there is no way to determine whether or not any copies are missing. Even if one knows how many copies should result, and the copy count produced by the copying equipment reveals that too few copies were made, it is still impossible to determine which document or documents are missing without manually checking the complete output copy set or sets.

More recently, in addition to making paper copies of documents, it has become possible to make digital images of the documents, which may be stored in or linked to the same database as the other document related information. The production of these digital images is subject to the same feeder-related difficulties as the production of paper copies—i.e., a feeder error can cause two documents to be fed at once, resulting in one document being missed.

It would be desirable to be able to increase the accuracy of document coding operations while increasing the speed of those operations.

It would further be desirable to be able to substantially eliminate the instances of missed documents when a set of documents is copied or scanned for imaging.

SUMMARY OF THE INVENTION

It is an object of this invention to increase the accuracy of document coding operations while increasing the speed of those operations.

It is a further object of this invention to substantially eliminate the instances of missed documents when a set of documents is copied or scanned for imaging.

In accordance with the present invention, there is provided a method for compiling a database for storage in a storage medium of an electronic processor, which database associates each document from a set of documents with at least one keyword from a set of keywords. The method includes generating a set of machine readable keyword indicia, each keyword indicium in the set of machine readable keyword indicia corresponding to one of the keywords in the set of keywords. The set of machine readable keyword indicia is applied to a substrate. A unique identifying datum for each said document is also generated and a machine readable document indicium corresponding to the identifying datum is applied to the document. A record is created, for entry in the database, associating the identifying datum with at least one of the machine readable keyword indicia, by reading the machine readable document indicium with a reader capable of reading both the document indicium and the keyword indicia, reading with that reader at least one of the machine readable keyword indicia from the substrate, each of the at least one of the machine readable keyword indicia corresponding to one of the keywords, and storing a record including said document indicium in association with that one of the keywords corresponding to each of the at least one of the machine readable keyword indicia.

A system for carrying out the method is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 is a representation of a document to which a bar code has been applied to represent a document number; and FIG. 6 is a schematic diagram of a preferred embodiment of a hardware system for implementing the present invention.

DETAILED DESCRIPTION OF THE INVENTION

Figure 1:
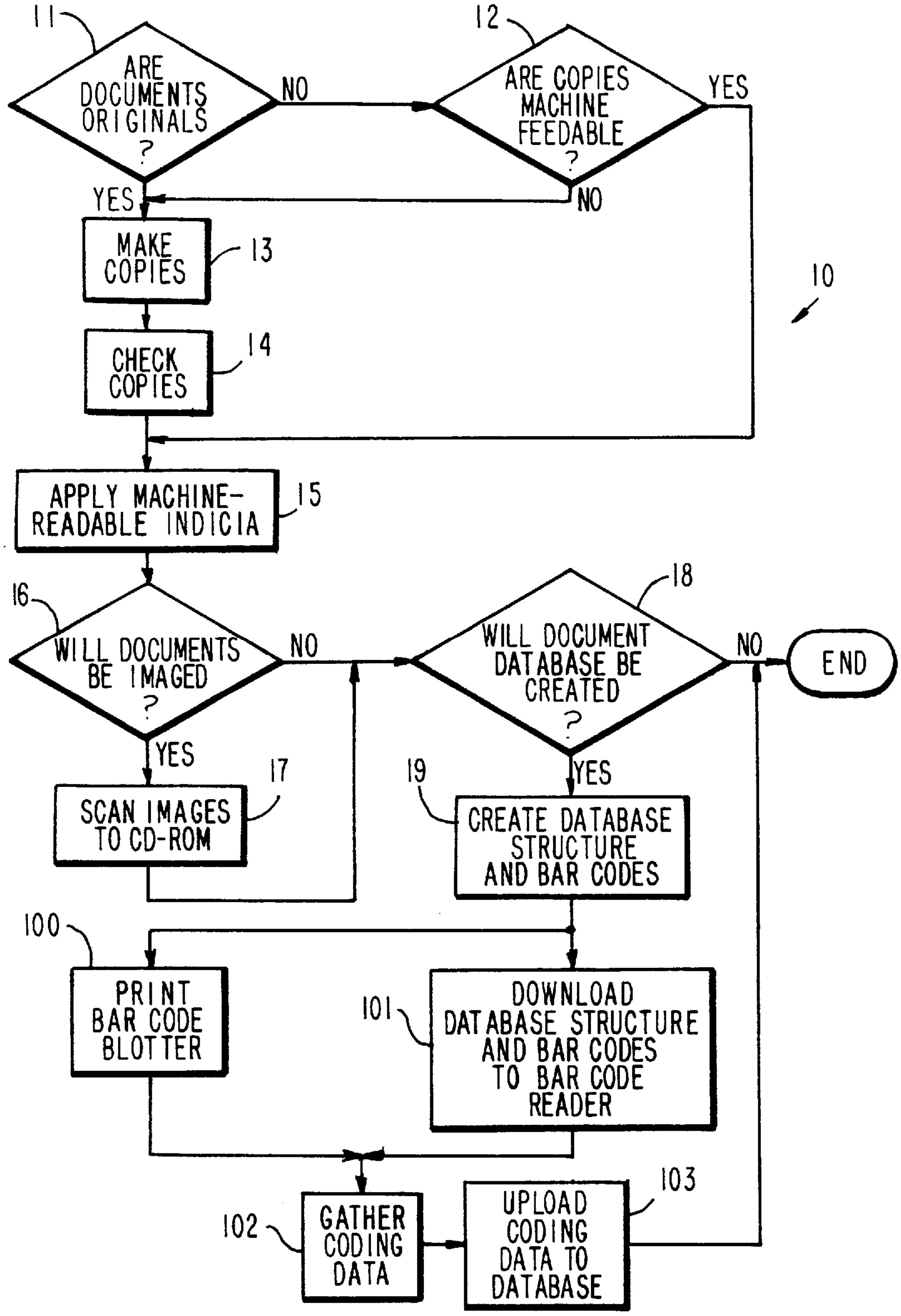
FIG. 1 is a flow diagram of a preferred embodiment of a document copying/imaging and coding method according to the present invention.

The present invention improves the processes of document copying or imaging, and coding, by increasing the use of bar codes in the document production environment. Bar codes applied to the documents themselves are used to indicate document numbers, and bar codes are also used to increase speed and accuracy of data entry in the coding process.

According to a preferred embodiment of the invention, a batch of documents to be processed is first preferably copied, preferably using standard xerographic or similar techniques. The copies preferably are compared manually to the original documents to check the order and copy quality of the copies. Next, the copies preferably are automatically numbered, and machine readable indicia—preferably bar codes—representing the document numbers preferably are applied to the copies. The copy set with numbers applied is then manually checked again to assure that the set is complete and in numerical order.

The documents preferably are then sent for imaging, further copying, or both. In either case, the document feeding systems on the copiers or imaging devices preferably include readers (preferably bar code readers, where the document number indicia are bar codes) for reading the document number indicia. As the feeding systems feed documents for copying or imaging, a processor to which the bar code readers are connected checks that the numbers scanned by the bar code readers are passing in the correct order. Preferably, in case of any discrepancy (e.g., a missing or out-of-order bar code), the system stops, and prints or displays an exception report, indicating the nature of the discrepancy. Alternatively, the system could continue, but would issue a warning, and also print or display the exception report. This helps assure that every document is copied or imaged, minimizing the effects of feeder or other errors.

To build a database associating the documents with desired keywords representing subject matter, persons mentioned, authors, recipients, etc., one first creates a list of keywords representing those items. This is done in a traditional way, with intellectual input from those who will be using the database, such as attorneys in a litigation context. Next, preferably using conventional bar code generating techniques, one preferably would generate a bar code for each keyword, whether it represents a subject matter item or an individual's name. More preferably, a bar code would be generated for each keyword in each context in which it appears. Thus, if the name "Jones" could appear as an author or recipient, or as someone mentioned in the third person, separate bar codes might be prepared for "To: Jones," "From: Jones" and "Re: Jones." A collection of the bar codes so created would be printed on a durable substrate, forming a menu or "blotter" of bar codes which are used as described below.

Operators, such as legal assistants, assigned to enter information into the database are given a set of document copies, which include the bar-coded document identifiers. They are also given the blotter of keyword bar codes, and a bar code reader.

For documents that have not been imaged, an operator would pick up each document, and first scan the bar code representing that document's identifier (e.g., a "Bates" number as commonly used in litigation). Next, the operator would review the document for names and subject matter items that have been designated as keywords. Each time such an item is found, the operator would scan that item'ss keyword bar code from the blotter. If separate bar codes for "To" and "From" an individual have not been provided as discussed above, the operator would have to indicate the context of the appearance of the keyword in the document. This could be accomplished either by pressing keys on a keyboard or keypad, or by scanning an additional bar code that specifies, e.g., "To," "From" or "Mentioned." When finished entering keywords for that document, the operator signifies the end of entries for that document by pressing an appropriate key or scanning an "End" bar code that is provided. Alternatively, and more preferably, the act of scanning the next document identifier signifies the end of the previous document (except in the case of the last document).

The bar code readers used by the operators could be directly connected to the computer on which the database resides, either by wire or by a wireless (e.g., radio-frequency) link. Preferably, however, stand-alone bar code readers with independent memory are used. Such bar code readers can be programmed to recognize the bar codes that will be encountered, and to store the results of scanning a substantial number of documents. After a scanning session, the contents of the bar code reader memory can be uploaded to the host computer on which the database resides.

Using stand-alone bar code readers substantially eliminates any limitation on the number of operators who can be coding documents at any one time, as the capacity of the host computer is not an issue. On the other hand, if connected bar code readers are used, real-time data on the progress of the coding operation is available. Either scheme can be used, depending on the needs of the individual situation.

After the scanning operation is complete, a database associating each document with its relevant keywords exists. If the documents have been imaged, then the image is also associated with the document number. Any user, such as an attorney working on a lawsuit, can search for any document by its keyword information. Once the system has identified documents meeting the desired keyword criteria, the user can obtain a copy from-a paper document set, or, where the documents have been imaged, use the system to call up the image of the document and, if desired, print it.

If in the course of a litigation, for example, additional keywords are created, the documents can be processed again for the new keywords only, by scanning each document number and scanning the relevant keyword bar codes from a revised blotter. The existing data stored for each document will be retained, and the newly-scanned data will be added to the database record for that document. Alternatively, such updates can be performed manually, by keyboard entry into the database.

It should be apparent that by using the system described, document data can be entered more quickly and accurately than by traditional keyboard methods.

A preferred embodiment of the method and system of the invention will now be described with reference to FIGS. 1–6.

FIG. 1 is a flow diagram showing a complete document processing method 10 incorporating the present invention. The method begins at test 11 where it is determined whether or not the documents to be processed are originals. If not, then the documents are copied and can be processed without concern for damaging the originals, and accordingly the method proceeds to test 12, where it is determined whether or not the documents (already determined to be copies) are in a condition suitable for machine feeding. If the documents are suitable for machine feeding, the method proceeds to step 15, discussed below.

If at test 12 it is determined that the document copies are not suitable for machine feeding, or if at test 11 it was determined that the documents are originals, then the method proceeds to step 13 where new copies are made.

These copies are checked manually at step 14 to make sure that they are in order and that there are no omissions.

At step 15, machine readable indicia are applied to the documents. As discussed above, these indicia, which represent document numbers, can be bar codes or other optically readable indicia such as characters (e.g., letters or numerals) in a font that can easily be read using optical character recognition (OCR) techniques.

Next, at test 16, it is determined whether or not document images are to be captured. This determination is made by the ultimate end users of the documents to be processed (i.e., the attorneys in the litigation support example discussed above). If images are to be captured, that is done at step 17, where the images are saved to a suitable medium such as CD-ROM. During this process, as discussed above, the presence of the machine readable indicia can be used to make sure that the document feeders do not miss a document (e.g., by feeding it together with another document).

After imaging, or if no imaging is to be done, a determination is made at test 18 as to whether or not a database is to be created. Again, this determination is made by the ultimate end users of the documents to be processed. If no database is to be created, the method ends. However, if a database is to be created, the creation occurs based on user input at step 19, where bar codes for relevant terms to be coded are created as discussed above. In the preferred embodiment, as a result of the database and bar code creation step 19, a blotter of bar codes (see FIG. 4) is printed at step 100, and at step 101 the database structure and bar codes are downloaded to the bar code readers to be used by the operators for coding.

The coding data is gathered by the operators at step 102, by, for each document, scanning with the bar code reader first the document identifying indicium, and then the appropriate bar code or codes from the blotter of bar codes. At step 103 the gathered coding data are uploaded to the database from the bar code readers, and the method ends.

Steps 101 and 103 preferably are performed only where stand-alone bar code readers are used. In systems according to the invention where hard-wired readers are used, the information is preferably transmitted to the database substantially as it is gathered. Similarly, in systems using wireless (e.g., radio-frequency) readers, the information would preferably be transmitted to the database substantially as it is gathered, but it may still be necessary to download to the readers the database structure and bar codes, as in step 101.

Figure 2:
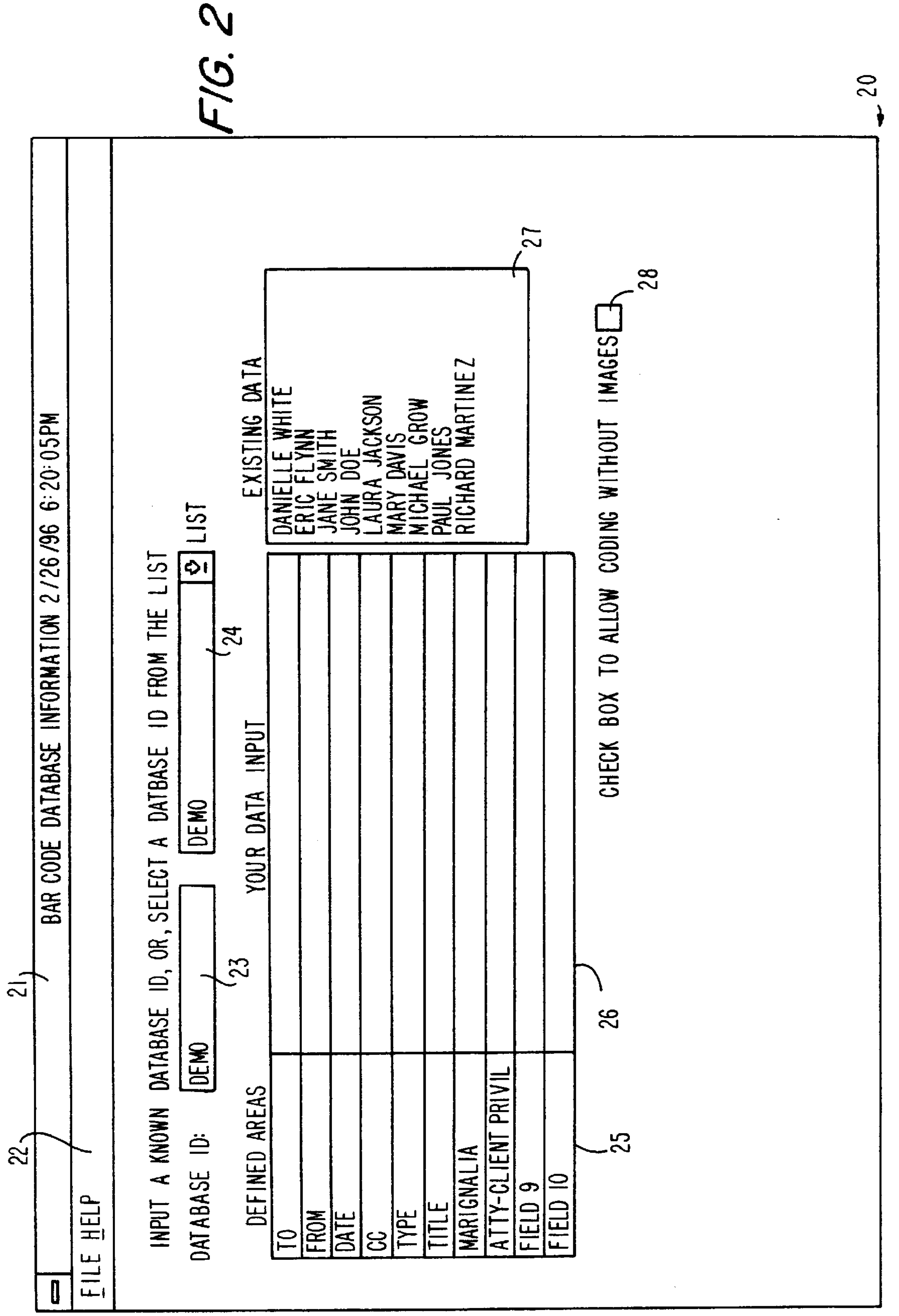
FIG. 2 is a representation of a computer screen display from a preferred embodiment of the database creation step of the present invention.
Figure 3:
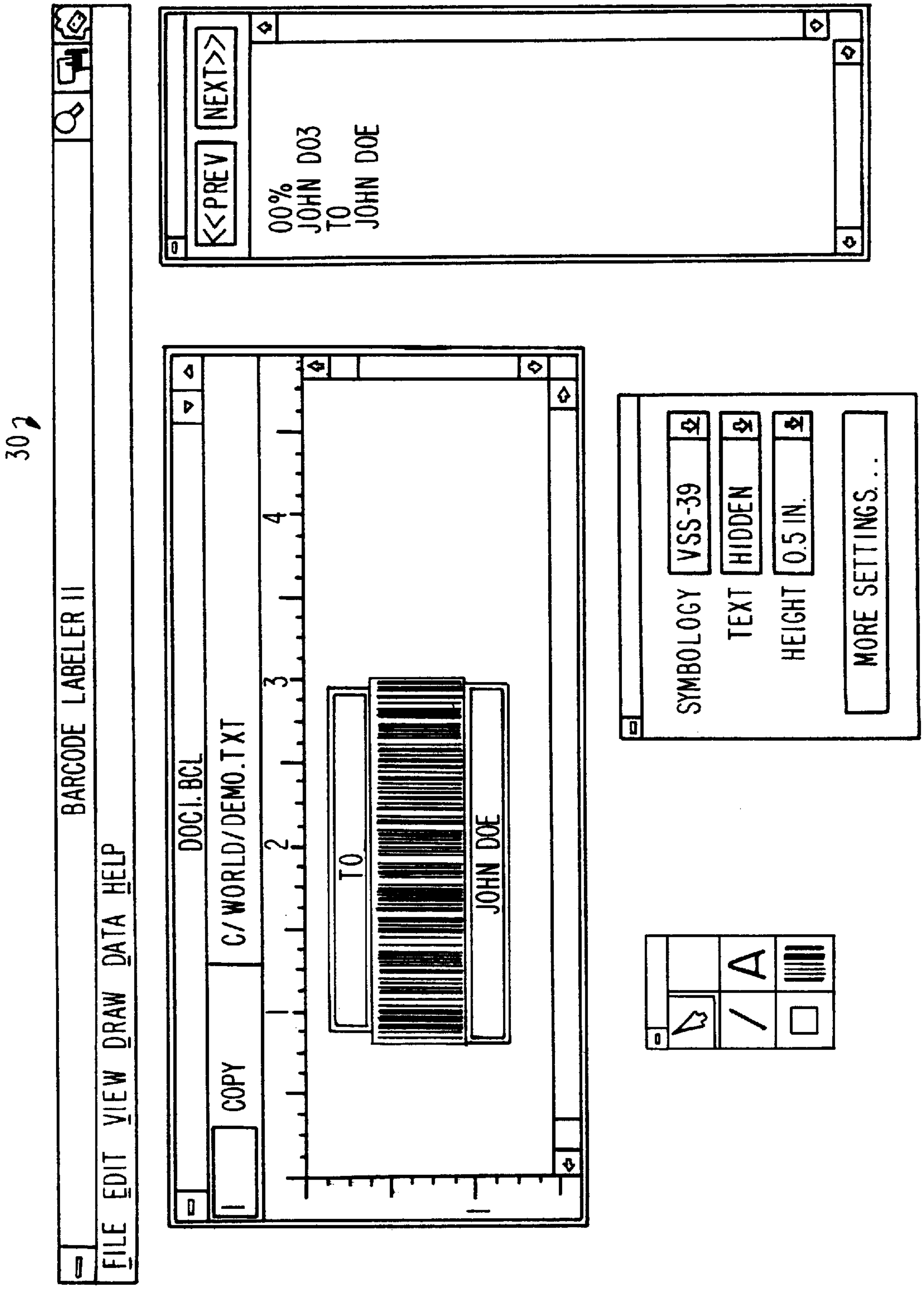
FIG. 3 is a representation of a computer screen display from a preferred embodiment of the bar code creation step of the present invention.

FIG. 2 shows a printout of a sample screen display 20 from the utility program that allows creation of the keyword bar codes. The program uses a standard interface such as a WINDOWS™ interface, available from Microsoft Corporation, of Redmond, Washington, having a title bar 21 and a menu bar 22. A user seeking to define, or alter the definition of, a bar code database, types the name of the database in box 23, or selects a name from the drop-down list in box 24. In the example shown, the user has selected a database called "DEMO," which has already been at least partly defined. Thus, in column 25, labelled "Defined Areas," there is a list of the various fields into which information is to be entered from the keyword list. Those fields includes, as can be seen, "TO," "FROM," "DATE," "CC," etc. For each of those fields, the user enters a name or other character string into the corresponding field in column 26, entitled "Your Data Input." This tells the system that a bar code should be produced that, when read, causes the name entered in advance in column 26 to be entered into the database in the field for which that bar code was prepared. Thus, there will be separate bar codes for "To John Doe," "From John Doe," "cc to John Doe," etc. Each time the user enters a name, in addition to being entered into the bar code database, the name is added to the list of names in column 27, labelled "Existing Data." The presence of a name in that column is a check for the user on whether or not bar codes for that name have already been set up. Check box 28 is provided to allow the option of setting up a database even when the documents are not being imaged. Checking box 28 tells the software not to set up a link from a record to a stored image.

Figure 4:
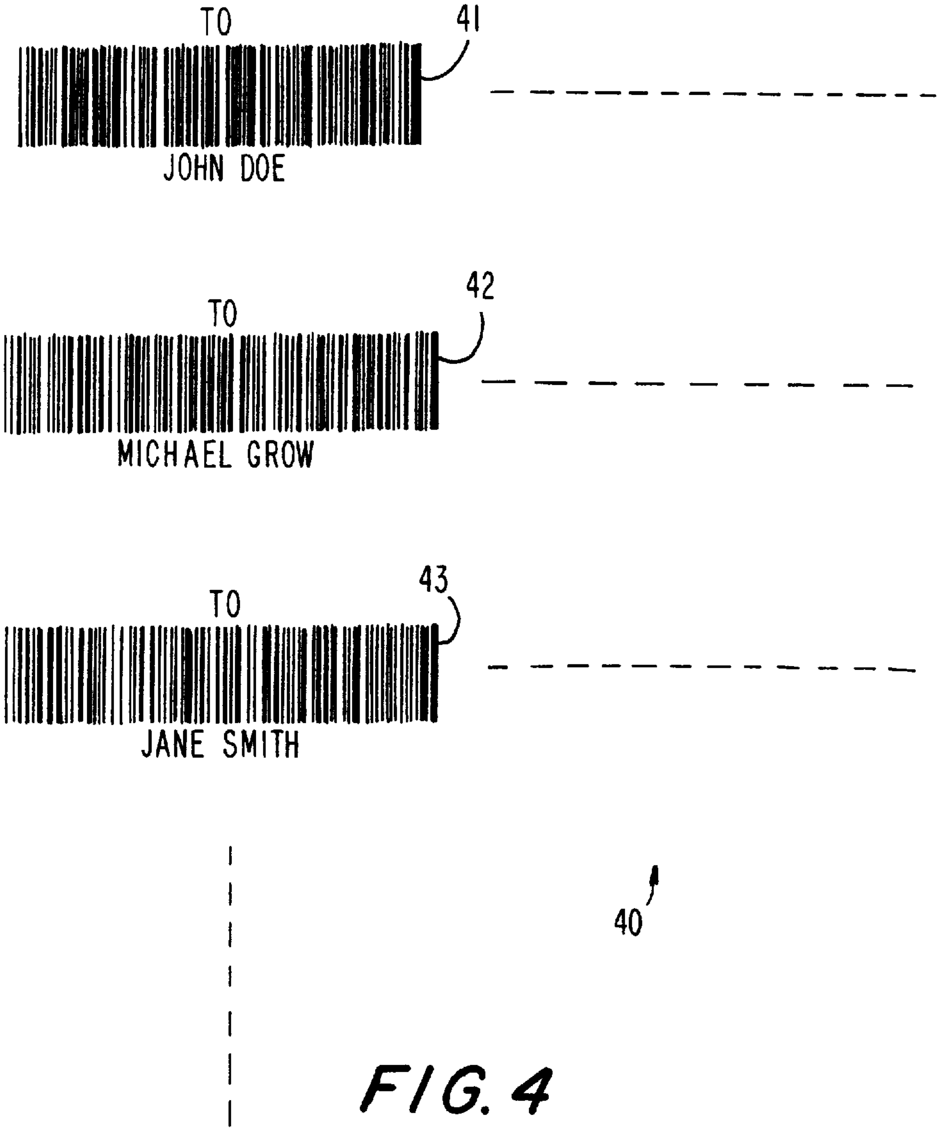
FIG. 4 is a sample of a bar code menu or blotter according to the present invention.

The actual creation and printing of the bar codes programmed using screen 20 shown in FIG. 2 is preferably carried out using conventional bar code creation software. For example, one could use BarCode Labeler II software available from Videx, Inc., of Corvallis, Oregon, having the user interface screen 30 shown in FIG. 3. A sample of the blotter 40 of bar codes 41–43 produced according to the invention is shown in FIG. 4.

A user of the system according to the invention, such as a legal assistant who is coding documents into a database, would, for each document such as document 50 shown in FIG. 5, preferably scan bar code 51 on document 50 with a bar code reader 52. Bar code 51 preferably contains a unique document identifier, such a sequential number (e.g., a "Bates" number). The user preferably would then review document 50 and preferably scan any keyword bar code 41–43 on blotter 40 that he or she deemed appropriate. The act of scanning those bar codes creates an association between the document identifier and the keywords represented by the bar codes, without the need for typing by the user, thereby eliminating entry errors.

Bar code reader 52 can be any suitable reader. As shown, bar code reader 52 is preferably a wireless bar code reader having a keypad 520 and a display 521, both of which are used by the user in the entry process. Display 521, in particular, allows the user to verify scanned entries. Bar code reader 52 is preferably a VIDEX® Time Wand II reader, available from Videx, Inc., of Corvallis, Oreg., which has sufficient memory to read 7,000 5-digit bar codes, and can be connected by a cable (not shown) to the host computer for uploading. Another suitable bar code reader is available from Hand Held Products, of Charlotte, N.C. Any other suitable bar code reader may also be used, including bar code readers with direct connections to the host computer or those with wireless links such as radio-frequency links.

The present invention may preferably be implemented on a hardware system 60 such as that shown in FIG. 60. System 60 is preferably based on a personal computer 61 of a type suitable for running the WINDOWS™ 3.1 or WINDOWS™ 95 operating system, available from Microsoft Corporation, of Redmond, Wash., which would be a personal computer having at least an 80386-type microprocessor or better.

Personal computer 61 preferably has some form of storage 62 (such as one or more hard disk drives) suitable for storing a database. In applications where imaging is to be used, if computer 61 is also to be used to store the images (rather than only for coding), some form of storage 63 (such as one or more CD-ROM drives) suitable for storing document images should be provided.

Personal computer 61 preferably also has an adaptor 64 for attaching a bar code reader 52. Bar code reader adapter 64 could be an expansion card that fits in personal computer 61, or an adapter that plugs into one of the input/output ports of personal computer 61. Bar code reader adapter 64 supports a connection 65 that may be wireless, permanently wired, or wired only for uploading and downloading purposes, depending on the type of bar code reader 52 that is used. The processor of personal computer 61 preferably serves as a storage controller for causing data gathered by various input devices—including a keyboard (not shown) as well as any bar code readers 52 connected through adapter 64 (or otherwise)—to be stored in storage 62.

If document imaging is used, the images may be provided from an outside source or, alternatively, system 60 could include a suitable scanner or image capture device 66, which may be conventional.

Although the present invention has heretofore been described in the context of bar codes and bar code readers, the document identifiers and the keywords could be encoded using a different optically readable format. For example, they could be printed using a font that is easily read by optical character readers, which in that embodiment would replace bar code readers. Nor is it necessary that an optical coding scheme be used. Instead, a magnetic coding scheme may be used. For example, a magnetic stripe may be applied to each document encoded with the document identifier, and the blotter of keywords could contain a magnetic stripe for each keyword. In that embodiment, the bar code readers could be replaced by magnetic stripe swipe readers. Other encoding techniques may be apparent to those of ordinary skill in the art.

Thus it is seen that a system and method are provided that increase the accuracy of document coding operations while increasing the speed of those operations, and that substantially eliminates the instances of missed documents when a set of documents is copied or scanned for imaging. One skilled in the art will appreciate that the present invention can be practiced by other than the described embodiments, which are presented for purposes of illustration and not of limitation, and the present invention is limited only by the claims which follow.

What is claimed is:

1. A method for compiling a database for storage in a storage medium of an electronic processor, said database associating each document from a set of documents with at least one keyword from a set of keywords, said method comprising:

generating a set of machine readable keyword indicia, each keyword indicium in said set of machine readable keyword indicia corresponding to one of said keywords in said set of keywords;

applying said set of machine readable keyword indicia to a substrate;

generating a unique identifying datum for each said document; and creating a record, for entry in said database, associating said identifying datum with at least one of said machine readable keyword indicia, said creating step comprising:

selecting a document identifying datum, reading with said reader at least one of said machine readable keyword indicia from said substrate, each said at least one of said machine readable keyword indicia corresponding to one of said keywords, and storing a record including said document identifying datum in association with said one of said keywords corresponding to each said at least one of said machine readable keyword indicia.

2. The method of claim 1 further comprising the step of applying to said document a machine readable document indicium corresponding to said identifying datum; wherein said selecting step comprises:

reading said machine readable document indicium with said reader, said reader being capable of reading said document indicium and said keyword indicia.

3. The method of claim 2 wherein:

said machine readable keyword indicia and said machine readable document indicium are optically readable; and said reading steps comprise scanning said indicia with optical readers.

4. The method of claim 3 wherein:

said indicia are bar codes; and said reading steps comprise scanning said indicia with bar code readers.

5. The method of claim 1 wherein:

said machine readable keyword indicia are optically readable; and said reading step comprises scanning said indicia with optical readers.

6. The method of claim 5 wherein:

said indicia are bar codes; and said reading step comprises scanning said indicia with bar code readers.

7. The method of claim 1 further comprising the step of, for each said record:

capturing a digital image of said document; and storing said digital image with said record.

8. The method of claim 1 further comprising the step of storing each said record in said database.

9. A system for compiling a database for storage in a storage medium of an electronic processor, said database associating each document from a set of documents with at least one keyword from a set of keywords, said system comprising:

a keyword indicia generator for generating a set of machine readable keyword indicia, each keyword indicium in said set of machine readable keyword indicia corresponding to one of said keywords in said set of keywords;

a printer for applying said set of machine readable keyword indicia to a substrate;

an identifying indicia generator for generating a unique identifying datum for each said document;

a reader for reading said keyword indicia from said substrate; and a storage controller for storing on said storage medium a record including said document identifying datum in association with said one of said keywords corresponding to each said at least one of said machine readable keyword indicia.

10. The system of claim 9 wherein:

said identifying indicia generator applies to said document a machine readable document indicium corresponding to said identifying datum; and said reader reads said document indicium from said document.

11. The system of claim 10 wherein:

said machine readable keyword indicia and said machine readable document indicium are optically readable; and said reader comprises an optical reader.

12. The system of claim 11 wherein:

said indicia are bar codes; and said optical reader comprises a bar code reader.

13. The system of claim 9 wherein:

said machine readable keyword indicia are optically readable; and said reader comprises an optical reader.

14. The system of claim 13 wherein:

said indicia are bar codes; and said optical reader comprises a bar code reader.

15. The system of claim 9 further comprising an imager for capturing a digital image of said document; wherein:

said storage controller stores said digital image with said record.

16. The system of claim 9 wherein each said record is stored in said database.

17. A method for compiling a database for storage in a storage medium of an electronic processor, said database comprising images of documents from a set of documents, said database associating each document from said set of documents with at least one keyword from a set of keywords, said method comprising:

generating a unique identifying datum for each said document and applying to said document a machine readable document indicium corresponding to said identifying datum;

capturing an image of each of said documents, said capturing step comprising, for each said document:

feeding said document to an imaging area, reading said machine readable document indicium on said document to determine said identifying datum, checking said identifying datum to determine if said identifying datum bears an expected relationship to identifying data of documents images of which were previously captured, and when said identifying datum bears said expected relationship, scanning said document to acquire a digital image thereof;

generating a set of machine readable keyword indicia, each keyword indicium in said set of machine readable keyword indicia corresponding to one of said keywords in said set of keywords;

applying said set of machine readable keyword indicia to a substrate; and creating a record, for entry in said database, associating said identifying datum with at least one of said machine readable keyword indicia, said creating step comprising:

reading said machine readable document indicium with a reader capable of reading said document indicium and said keyword indicia, reading with said reader at least one of said machine readable keyword indicia from said substrate, each said at least one of said machine readable keyword indicia corresponding to one of said keywords, and storing a record including said digital image in association with said document indicium and said one of said keywords corresponding to each said at least one of said machine readable keyword indicia.

18. The method of claim 17 wherein:

said machine readable keyword indicia and said machine readable document indicium are optically readable; and said reading steps comprise scanning said indicia with optical readers.

19. The method of claim 18 wherein:

said indicia are bar codes; and said reading steps comprise scanning said indicia with bar code readers.

20. The method of claim 17 further comprising the step of storing each said record in said database.

21. A system for compiling a database for storage in a storage medium of an electronic processor, said database comprising images of documents from a set of documents, said database associating each document from said set of documents with at least one keyword from a set of keywords, said system comprising:

an identifying indicia generator for generating a unique identifying datum for each said document and applying to said document a machine readable document indicium corresponding to said identifying datum;

an image capturer for capturing an image of each of said documents, said image capturer capturing step each said document by:

feeding said document to an imaging area, reading said machine readable document indicium on said document to determine said identifying datum, checking said identifying datum to determine if said identifying datum bears an expected relationship to identifying data of documents images of which were previously captured, and when said identifying datum bears said expected relationship, scanning said document to acquire a digital image thereof;

a keyword indicia generator for generating a set of machine readable keyword indicia, each keyword indicium in said set of machine readable keyword indicia corresponding to one of said keywords in said set of keywords;

a printer for applying said set of machine readable keyword indicia to a substrate; and a recorder for creating a record, for entry in said database, associating said identifying datum with at least one of said machine readable keyword indicia, said recorder comprising:

a reader for reading document indicium from said document and said keyword indicia from said substrate, and a storage controller for storing a record including said digital image in association with said document indicium and said one of said keywords corresponding to each said at least one of said machine readable keyword indicia.

22. The system of claim 21 wherein:

said machine readable keyword indicia and said machine readable document indicium are optically readable; and said reader is an optical reader.

23. The system of claim 22 wherein:

said indicia are bar codes; and said optical reader comprises a bar code reader.

24. The system of claim 21 wherein each said record is stored in said database.

* * * * *

UNITED STATES PATENT AND TRADEMARK OFFICE

CERTIFICATE OF CORRECTION

PATENT NO. : 5,848,202

DATED : December 8, 1998

INVENTOR(S) : John R. D'Eri et al.

It is certified that error appears in the above-identified patent and that said Letters Patent is hereby corrected as shown below:

ON THE TITLE PAGE:

Item [56] References Cited, "5,467,933" should be --5,467,433 --.

Col. 3, line 63, "item'ss" should be -- item's --.

Col. 4, line 34, "from-a" should be -- from a --.

Col. 5, line 62, "includes," should be -- include, --.

Claim 21, col. 10, line 21, "step" should be deleted.

Signed and Sealed this

Thirteenth Day of June, 2000

Attest:

Q. TODD DICKINSON

*Attesting Officer*

*Director of Patents and Trademarks*